United States Patent
Haddad et al.

(10) Patent No.: US 11,876,881 B2
(45) Date of Patent: Jan. 16, 2024

(54) MECHANISM TO ENABLE THIRD PARTY SERVICES AND APPLICATIONS DISCOVERY IN DISTRIBUTED EDGE COMPUTING ENVIRONMENT

(71) Applicant: Telefonaktiebolaget LM Ericsson (publ), Stockholm (SE)

(72) Inventors: Wassim Haddad, Palo Alto, CA (US); Joel Halpern, Leesburg, VA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/757,079

(22) PCT Filed: Dec. 10, 2019

(86) PCT No.: PCT/IB2019/060636
§ 371 (c)(1),
(2) Date: Jun. 9, 2022

(87) PCT Pub. No.: WO2021/116732
PCT Pub. Date: Jun. 17, 2021

(65) Prior Publication Data
US 2023/0007105 A1 Jan. 5, 2023

(51) Int. Cl.
*H04L 69/163* (2022.01)
*H04L 61/4511* (2022.01)
*H04L 9/40* (2022.01)

(52) U.S. Cl.
CPC ........ *H04L 69/163* (2013.01); *H04L 61/4511* (2022.05); *H04L 63/166* (2013.01)

(58) Field of Classification Search
CPC . H04L 69/163; H04L 61/4511; H04L 63/166; H04L 61/5007
See application file for complete search history.

(56) References Cited

U.S. PATENT DOCUMENTS

| | | | |
|---|---|---|---|
| 9,602,330 B1* | 3/2017 | Dickinson | H04L 63/1458 |
| 10,735,370 B1* | 8/2020 | Kandlur | G06F 9/542 |
| 11,336,692 B1* | 5/2022 | McCorkendale | H04L 63/1441 |
| 2002/0112076 A1* | 8/2002 | Rueda | H04L 12/1432 709/206 |
| 2009/0083422 A1* | 3/2009 | McKay | H04L 63/0272 709/225 |

(Continued)

OTHER PUBLICATIONS

International Search Report and Written Opinion for Application No. PCT/IB2019/060636, dated Apr. 16, 2020, 10 pages.
(Continued)

*Primary Examiner* — Jimmy H Tran
(74) *Attorney, Agent, or Firm* — Nicholson De Vos Webster & Elliott LLP (57) ABSTRACT

A method and system support communication between a service executed by an edge server and a mobile application. The method includes receiving a transmission control protocol (TCP) handshake with an Internet Protocol (IP) anycast address from the mobile application; replying to the TCP handshake with an IP unicast address for the service to be utilized for a transport layer security (TLS) session; and establishing the TLS session between the service and the mobile application using the IP unicast address.

20 Claims, 7 Drawing Sheets

(56) References Cited

U.S. PATENT DOCUMENTS

| | | | | |
|---|---|---|---|---|
| 2009/0262741 A1* | 10/2009 | Jungck | H04L 47/24 | 370/392 |
| 2010/0057894 A1* | 3/2010 | Glasser | H04L 61/4511 | 709/222 |
| 2010/0189099 A1* | 7/2010 | Bae | H04L 61/2575 | 370/352 |
| 2012/0207151 A1* | 8/2012 | Alt | H04L 65/104 | 370/395.54 |
| 2013/0117437 A1* | 5/2013 | Tseng | H04L 61/2575 | 709/224 |
| 2014/0372747 A1* | 12/2014 | Krieger | H04L 63/168 | 713/151 |
| 2015/0281367 A1* | 10/2015 | Nygren | H04L 65/1066 | 709/228 |
| 2016/0087933 A1* | 3/2016 | Johnson | H04L 41/08 | 709/245 |
| 2016/0373412 A1* | 12/2016 | MacCarthaigh | H04L 63/0428 | |
| 2018/0191666 A1* | 7/2018 | Rahman | H04L 67/51 | |
| 2018/0295134 A1* | 10/2018 | Gupta | H04L 67/56 | |
| 2019/0132280 A1* | 5/2019 | Meuninck | H04L 69/321 | |
| 2019/0143036 A1* | 5/2019 | Dumont | A61M 5/172 | 604/65 |
| 2020/0213266 A1* | 7/2020 | Sichevoy | H04L 63/20 | |
| 2020/0213277 A1* | 7/2020 | Rudnik | H04L 12/4641 | |
| 2020/0314067 A1* | 10/2020 | Rudnik | H04L 63/0272 | |
| 2020/0351244 A1* | 11/2020 | Moore | H04L 63/20 | |
| 2021/0014328 A1* | 1/2021 | Singhal | H04L 69/16 | |
| 2021/0029074 A1* | 1/2021 | Buck | H04L 61/5007 | |
| 2021/0029080 A1* | 1/2021 | Shribman | H04L 61/5007 | |
| 2021/0067493 A1* | 3/2021 | Vixie | H04L 63/0236 | |
| 2021/0211504 A1* | 7/2021 | Chen | H04L 67/14 | |
| 2022/0078165 A1* | 3/2022 | Ludin | H04L 63/0807 | |
| 2022/0141172 A1* | 5/2022 | Brown | H04L 63/0876 | 709/206 |
| 2022/0210114 A1* | 6/2022 | Buck | H04L 61/5007 | |
| 2022/0239757 A1* | 7/2022 | Marquardt | H04L 61/5007 | |
| 2022/0247821 A1* | 8/2022 | Prodoehl | H04L 12/4641 | |
| 2022/0311734 A1* | 9/2022 | Boucadair | H04L 61/4511 | |
| 2022/0368676 A1* | 11/2022 | Shribman | H04L 63/029 | |
| 2022/0368725 A1* | 11/2022 | Wright | H04L 63/20 | |
| 2022/0393886 A1* | 12/2022 | Williams | H04L 9/0894 | |
| 2023/0045757 A1* | 2/2023 | Knecht | H04L 67/1031 | |
| 2023/0133809 A1* | 5/2023 | Ayyadevara | H04L 67/563 | 709/225 |
| 2023/0231780 A1* | 7/2023 | Qiu | H04L 12/1863 | 370/252 |
| 2023/0259570 A1* | 8/2023 | Shribman | G06F 9/547 | 709/217 |

OTHER PUBLICATIONS

P. Hoffman et al., "DNS Queries over HTTPS (DoH)," Oct. 2018, 21 pages, RFC 8484, 2018 IETF Trust and the persons identified as the document authors.

* cited by examiner

MECHANISM TO ENABLE THIRD PARTY SERVICES AND APPLICATIONS DISCOVERY IN DISTRIBUTED EDGE COMPUTING ENVIRONMENT

CROSS-REFERENCE TO RELATED APPLICATIONS

This application is a National stage of International Application No. PCT/IB2019/060636, filed Dec. 10, 2019, which is hereby incorporated by reference.

TECHNICAL FIELD

Embodiments of the invention relate to the field of distributed edge computing; and more specifically, to the process of application service discovery and third party application and service support for edge computing environments.

BACKGROUND ART

Edge computing is a form of distributed computing where computational resources and storage are located closer to user devices in comparison to cloud computing and similar computing paradigms. Edge computing is intended to improve latency and reduce bandwidth utilization. Edge computing is often utilized by telecommunication company networks such as a part of cellular communication networks. Edge computing can be utilized to position content closer to users. Edge computing can also be utilized to offer services or computing resources to applications running on user devices. Edge computing can further offer virtualization of functions and operating environments that make it easier to deploy and run a wider range of applications on edge computing devices at edge computing sites.

Edge computing is expected to play an important role in the deployment of 5th Generation cellular mobile communications (5G) technology. 5G cellular telecommunication company distributed edge computing deployment requires running components of a 5G core, e.g., a User Plane Function (UPF), at each edge computing site. In order to communicate with mobile users, third party applications (i.e., applications not provided or developed by the telecommunication company, network operator, or the user) running on the edge computing resources get their packets routed to the mobile user's associated UPF. Third party applications and services deployed at edge computing sites will be packaged in different forms, e.g., virtual machines, containers, Unikernels, and similar forms. These applications and services can also migrate between different edge computing sites. Application deployment at a particular edge computing site is constrained mostly by computing resources. Such constraint may be caused by multi-tenancy requirements and/or service level agreements (SLAs), and similar considerations. Whether a third party application or service is deployed in all edge computing sites or selected ones depends on the application or service characteristics (e.g., SLA) as well as edge computing resource availability.

DNS over HTTPS (DoH) is a protocol for performing remote Domain Name System (DNS) resolution over the hypertext transport protocol secure (HTTPS) protocol. DoH is designed to increase user privacy and security by preventing eavesdropping and manipulation of DNS data by using the HTTPS protocol to encrypt the data between the DoH client and the DoH server, which is a DNS service. DoH is also designed to improve performance relative to traditional internet service provider (ISP) based DNS services. DoH services are expected to be deployed in edge computing sites in a 5G network.

SUMMARY

In one embodiment, a method of supporting communication between a service executed by an edge server and a mobile application is provided. The method includes receiving a transmission control protocol, TCP, handshake with an Internet Protocol, IP, anycast address from the mobile application; replying to the TCP handshake with an IP unicast address for the service to be utilized for a transport layer security, TLS, session; and establishing the TLS session between the service and the mobile application using the IP unicast address.

In further embodiments, a machine-readable medium includes computer program code which when executed by a computer carries out the method of supporting communication between the service executed by the edge server and the mobile application. The further embodiments also include an electronic device configured to execute the method for supporting communication between the service executed by the edge server and the mobile application. In some embodiments, the electronic device is configured to execute a plurality of virtual machines, where the plurality of virtual machines implements the service using network function virtualization (NFV). In some embodiments, the electronic device is a control plane device configured to implement a control plane of a software defined networking (SDN) network that supports the service.

In another embodiment, another method is provided of supporting communication between a mobile application executed by a mobile device and an edge service, where the another method includes sending a transmission control protocol, TCP, handshake with an Internet Protocol, IP, anycast address to the edge service; receiving a reply to the TCP handshake with an IP unicast address for the edge service to be utilized for a transport layer security, TLS, session; and establishing the TLS session between the edge service and the mobile application using the IP unicast address.

In further embodiments, another machine-readable medium includes computer program code which when executed by a computer carries out the another method of supporting communication between the mobile application executed by the mobile device and the edge service. The further embodiments also include an electronic device configured to execute the another method for supporting communication between the mobile application executed by the mobile device and the edge service according to the another method. In some embodiments, the electronic device is configured to execute a plurality of virtual machines, where the plurality of virtual machines implements the service implementing the another method using network function virtualization (NFV). In some embodiments, the electronic device is a control plane device configured to implement a control plane of a software defined networking (SDN) network that supports the service implementing the another method.

BRIEF DESCRIPTION OF THE DRAWINGS

The invention may best be understood by referring to the following description and accompanying drawings that are used to illustrate embodiments of the invention. In the drawings.

DETAILED DESCRIPTION

The following description describes methods and apparatus for utilizing domain name system (DNS) over hypertext transfer protocol secure (HTTPS) (DoH) services to support third party applications and services in a network with edge computing. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The embodiments overcome disadvantages of the prior art. In certain telecommunication network deployment models of the prior art, during an ongoing session between a third party application on a mobile user device and a third party application service deployed at a particular edge computing site, the third party application on the mobile user device may have to re-attach to another edge computing site causing the session to drop, e.g., because of an Internet Protocol (IP) address change. This means the third party application running on the mobile user device will need to re-establish communication with the third party application service running on the new edge computing site. In addition, if an instance of the same third party application service is running at the new edge computing site, it may be better for the third party application on the mobile device to connect to it. The prior art does not provide a process where the third party application on the mobile user device is able to discover the third party application service at the new edge computing site.

The embodiments improve the initial communication between applications and services that benefit from localization of computation. There is no need for a special protocol to allow the services to determine the location of the user, then to determine where the application instance is to be located, and then to redirect the client to that instance. Instead, by directing the DoH traffic to the local instance of the DNS resolution server, the determination of the correct service location is inherent.

The embodiments provide a process and system to overcome the problems of the prior art. In some embodiments, a mobility requirement embeds a discovery phase during which, the third party application running on the mobile user device gets to learn the third party application service IP address and (re)-establish connectivity. In the embodiments, the process and system provide a discovery phase for the third party application. The embodiments provide a discovery process that provides advantages that are desirable because the current (third generation partnership project (3GPP)) specification suggests that telecommunication network operators play an active role whereby the network operator provides the third party applications and services with the exact location of a mobile user device. Using such info, the third party application services is expected to be able to send a DNS reply that would point the third party application on the mobile user device to a third party application service instance running at a convenient edge computing site. However, such a procedure that would be consistent with this telecommunication network provider provision of location information puts additional complexities and requirements on both the telecommunication network and the operation of third party applications.

The embodiments provide a process and system where third party services and applications have a discovery process using DoH in distributed edge computing environments including in telecommunication network edge computing deployment scenarios. The advantages of the embodiments include reducing application level communication complexities between telecommunication network infrastructure and third party applications and services. Such communication without the embodiments is too costly on both sides and makes the third party applications and services tightly dependent on the telecommunication network operator, which is a disincentive for third party application and service developers to utilize the edge computing resources. The embodiments reduce the burden on small and medium sized enterprises to deploy applications at telecommunication network edge computing sites by removing the dependency requirement on telecommunication network infrastructure to track the mobile user devices. The embodiments enable telecommunication network operators to offer distributed edge computing solutions in the near future, e.g., no need to wait for 5G components to be deployed.

Figure 1:
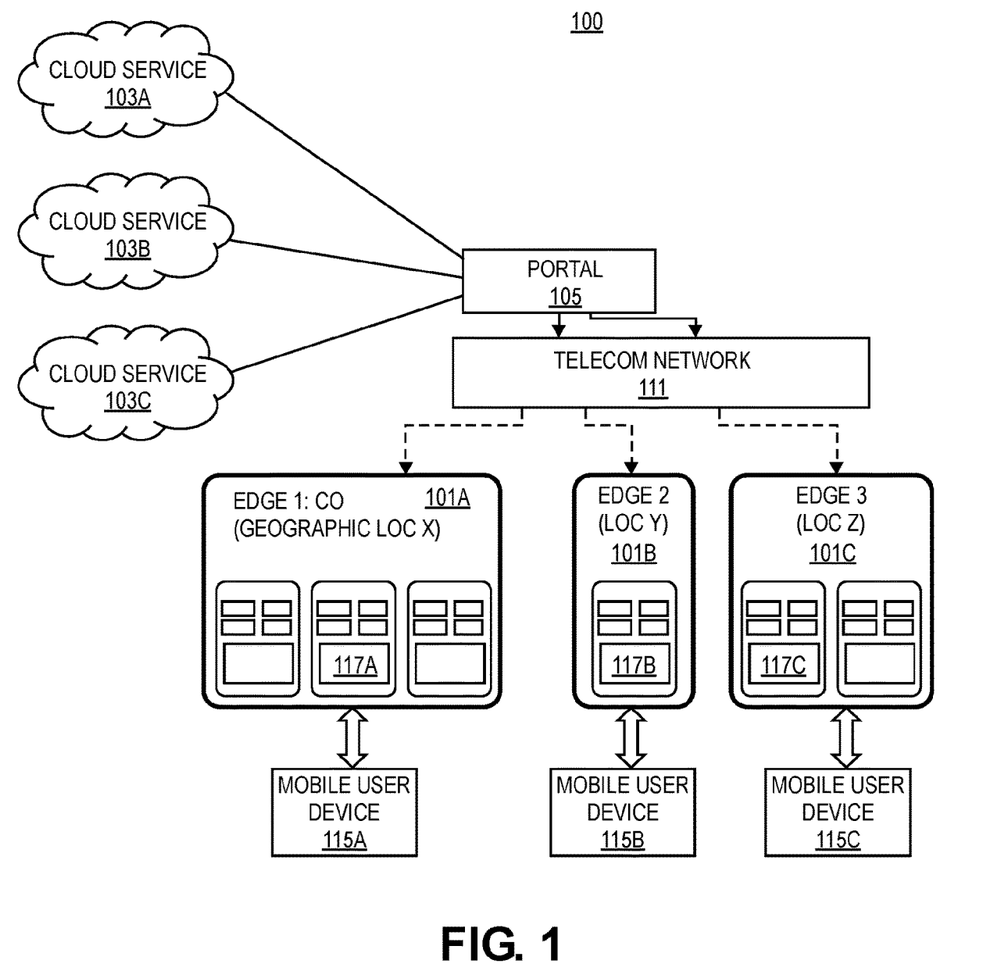
FIG. 1 is a diagram of one embodiment of a network with edge computing resources.

FIG. 1 is a diagram of one embodiment of a network with edge computing resources. In the example network, the elements have been abstracted to illustrate those aspects most relevant to the embodiments. One skilled in the art would understand that other similar networks that provide edge computing resources can also be utilized in conjunction with the embodiments described herein. The example network of FIG. 1 is provided by way of example and not limitation.

The network 100 can be provided and administered by a telecommunications network operator. The network 100 can include a core telecommunication network 111 that can include any combination and number of network resources and technologies that enable the mobile user devices 115A-C to communicate with the core telecommunication network 111, edge computing resources 117A-C, cloud service resources 103A-C and similar devices and resources. The mobile user devices 115A-C can be any type of computing device (e.g., smartphones, handheld devices, and similar computing devices) capable of communicating with the network 100. The mobile user devices 115A-C can communicate via a radio access network (RAN) or similar medium with any one of a set of edge computing sites 101A-C. The edge computing sites 101A-C can be geographically distributed to locations (e.g., locations X-Z) that enable positioning of edge computing resources 117A-C in proximity to mobile user devices 115A-C.

The edge computing sites 101A-C can each house any amount or type of edge computing resources 117A-C including computing, storage, networking, virtualization, and similar resources. The edge computing resources 117A-C can be used by third party application and services providers to position applications and services in proximity to mobile user devices 115A-C through multi-tenant virtualized environments administered by the telecommunication network providers to service the third party applications executed at mobile user devices 115A-C.

The network 100 can also enable communication and access to cloud services 103A-C by the telecommunication network core 111, edge computing sites 101A-C, and mobile user devices 115A-C. Third party applications and service providers can position services and applications both in cloud services 103A-C and in the edge computing sites 101A-C. Third party applications and services can migrate between edge computing sites 101A-C, cloud services 103A-C, and similar locations in the network 100. In some embodiments, a portal 105 enables third party application and service providers to instantiate and manage the instances of their services and application at edge computing sites 101A-C.

As used herein, a third party application is a program that can execute in a mobile user device, an edge computing site, or other location in the network 100. A third party application executing on a mobile user device can interact with a third party service or application instance at an edge computing site 101A-C or similar location in the network 100. Third party services or application services including instances thereof are functions and programs that are executed in a computing device (e.g., in an edge computing site) or similar location in the network and generally provide services to third party applications on the mobile user devices.

Figure 2:
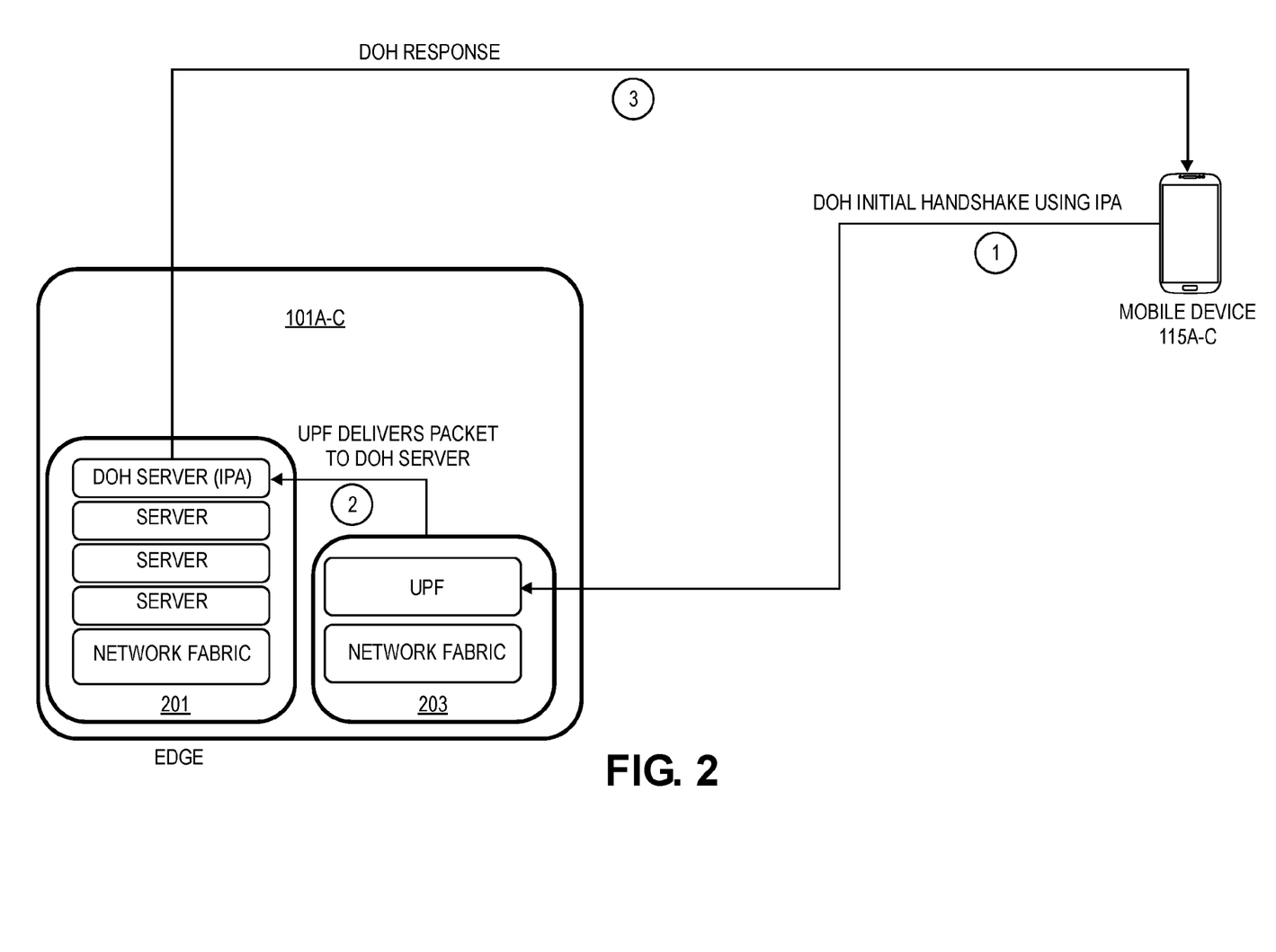
FIG. 2 is a diagram of one example embodiment of domain name system (DNS) over hypertext transfer protocol secure (HTTPS) (DoH) implemented in an edge computing system to support third party applications and services.

FIG. 2 is a diagram of one example embodiment of domain name system (DNS) over hypertext transfer protocol secure (HTTPS) (DoH) implemented in an edge computing system to support third party applications and services. In this example, a third party application is executing on a mobile user device 115A-C. The mobile user device 115A-C has connected with a new edge computing site 101A-C that is more proximate than a prior edge computing site 101A-C or in a case of initial connection to the network. The edge computing site 101A-C can offer a set of services including services of the third party application and service provider. In the example, the third party application and service provider provides services in a virtual execution environment 201. The virtual execution environment can include any number of services that support the applications of the third party application and service provider that are executing at connected mobile user devices 115A-C. The services can include a DoH server 205, such as a DoH server 205 that supports Internet Protocol Anycast (IPA).

When the mobile user device 115A-C initially connects to a new edge computing location 101A-C, due to migration or initial system connection with the network, the third party application can initiate a DoH handshake using an IPA address known to the third party application. The IPA address can be provided to the third party application as part of its installation, configuration, or similar process. In some embodiments, the DoH server IPA address is provided to the third party application at the mobile user device after being installed on the mobile user device (e.g., via DNS).

When the mobile device attaches to a new edge computing site, it changes its anchor point and obtains different IP addresses. The third party application at the mobile user device may try to discover the IP address of an application service instance at the new edge computing site. For this, it probes the closest (topologically) DoH server by using IPA. If an application instance is running at the new edge computing site, it means a co-located DoH server should be able to respond to the third party application request.

The IPA address is general to the DoH server at any edge computing site 101A-C for a given third party application and service provider. However, the IPA address cannot be utilized in the reply of the DoH server, as discussed further herein below. The third party application sends the DoH handshake request using the IPA address to the edge computing site 101A-C where it is initially processed by the telecommunication network functions provided in an operating environment 203. The telecommunication network functions include a user plane function (UPF) that determines how the packet received from the mobile user device 115A-C is forwarded. The UPF forwards the received packet based on the IPA address to the local DoH server or the closest DoH server when not available in the same edge computing site 101A-C. If no application service instance is running at the new edge computing site 101A-C, the UPF can route the IP anycast message to another edge computing site, which may or may not be the previous one the third party application was using.

The DoH server receives the DoH handshake request and prepares a DoH reply that includes an IP address for the specific DoH server that is responding to enable further communication that will allow the third party application at the mobile user device 115A-C to establish the location and continue communication with the third party application services at the edge computing site 101A-C. For a specific third party application and service provider, a DoH server can respond to all DNS queries regarding all application instances running at the same edge computing site 101A-C. This can include different applications and services from the same third party application and services provider. For a specific third party application and service provider, the DoH servers running at one particular edge computing cite can exchange messages between themselves, in order to provider an answer to a DNS query. To obtain information about third party applications, a corresponding DoH server of the third party applications and service provider may query application instances about its IP address or may be remotely configured.

In some embodiments, e.g., in a microservices-oriented architecture, it is possible to have a DoH server instance associated only with one third party application instance at a time. In this deployment, only one DoH server is assigned an IPA address and this DoH sever will also offer DNS-type of service to other DoH servers that can be local to the edge computing site. For example, the DoH server can select and include the unicast IP address of a local DoH server in the TCP option which would direct the third party application to establish a transport layer security (TLS) session with it. In this case, the TLS session may provide different sessions keys to communicate with both the local DoH server as well as with the application service instance.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 3:
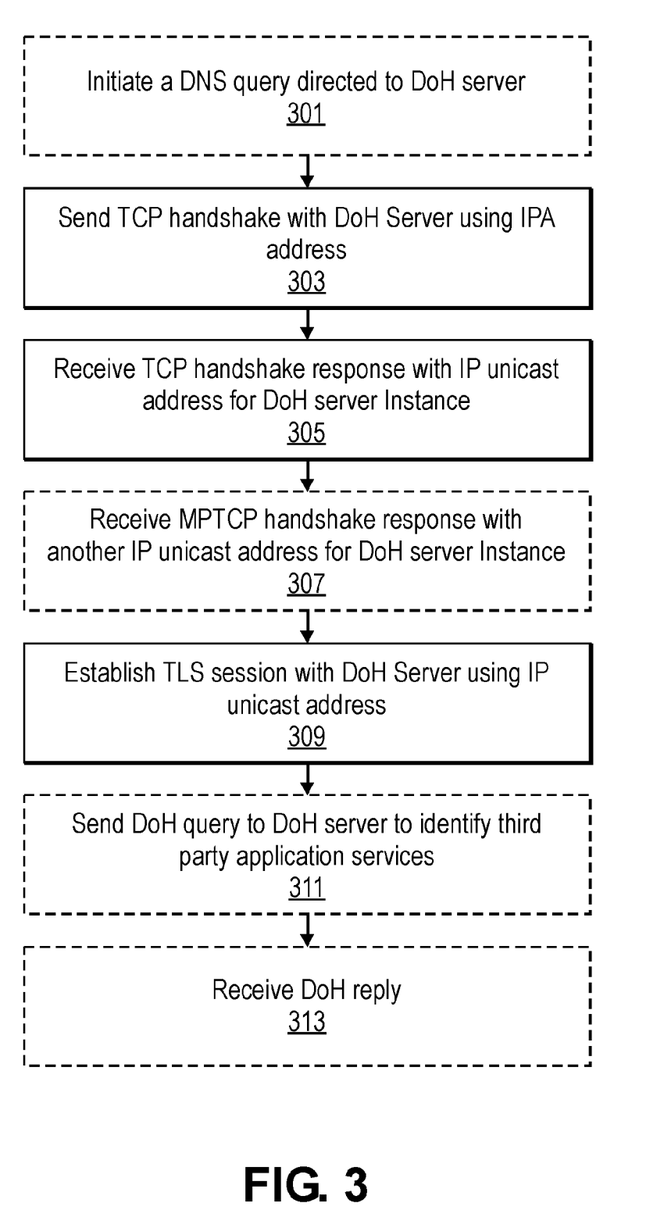
FIG. 3 is a flowchart of one embodiment of a process of a third party application using the DoH service at an edge device.

FIG. 3 is a flowchart of one embodiment of a process of a third party application using the DoH service at an edge device. When a third party application at a user mobile device needs DNS information to locate third party applications services, the third party application will initiate a DoH query (Block 301) that will be directed to a DoH server. The third party application first sends a transmission control protocol (TCP) handshake to an IPA address of the DoH server (Block 303). This TCP handshake will be inherent to establishing a transport layer security (TLS) session. However, an IP anycast address cannot be used as source address, which prevents the DoH server from using the IP anycast address to respond to the TCP handshake using standard TCP handshake response. The DoH server can respond with an IP unicast address (i.e., an IP address specific to the responding DoH server instance) (Block 305). The IP unicast address can be provided using different methods. In one example embodiment, the TCP handshake response can be modified to insert a field carrying an IP unicast address assigned to a DOH server instance. In this scenario, the TLS session that is subsequently established using the IP unicast address and all following messages will use the DoH server's IP unicast address. In another embodiment, both endpoints (i.e., the third party application and the DoH server instance) use multipoint TCP (MPTCP). In this embodiment, during the initial TCP handshake, the DoH server instance will use its IP unicast address to respond to the mobile device as an additional IP address (Block 307).

Once the third party application receives the IP unicast address of the DoH server instance, then the third party application can complete the establishment of a TLS session with the DoH server using the IP unicast address (Block 309). With the TLS session established, the DoH query for third party application services can be sent to the DoH server (Block 311). The DoH server can then provide the third party application with a DNS reply over HTTPS (i.e., a DoH reply) (Block 313) that can be utilized to maintain or start communication between the third party application at the mobile user device with the third party application services at the edge computing site.

Figure 4:
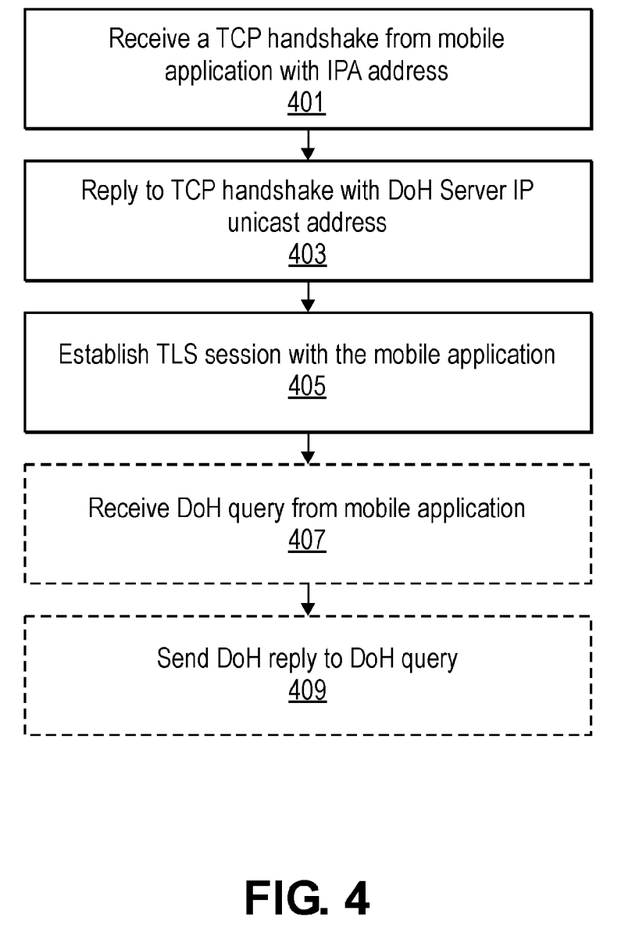
FIG. 4 is a flowchart of one embodiment of a process of a third party DoH service at an edge computing device.

FIG. 4 is a flowchart of one embodiment of a process of a third party DoH service at an edge device. The DoH service is provided by a third party application and service provider and can service all applications of the third party application and service provider or any subset of the applications of the third party application and service provider. The process can be initiated by receiving a TCP handshake destined for an IP anycast address associated with DoH service (Block 401). The DoH server can reply to the TCP handshake with a TCP handshake reply that specifies an IP unicast address specific to the DoH server instance (Block 403). The IP unicast address can be provided by an added field or similar modification to the TCP handshake reply or by use of MPTCP where the reply uses the IP unicast address.

After the TCP session is established, then a TLS session can be set up using TCP between the DoH server instance and the mobile application (Block 405). The mobile application can use the TLS session to send a DoH query to identify a location of other services of the third party application and service provider relevant to the mobile application (Block 407). The DoH server can then reply with the requested information via a DoH reply to the mobile application (Block 409).

Figure 5A:
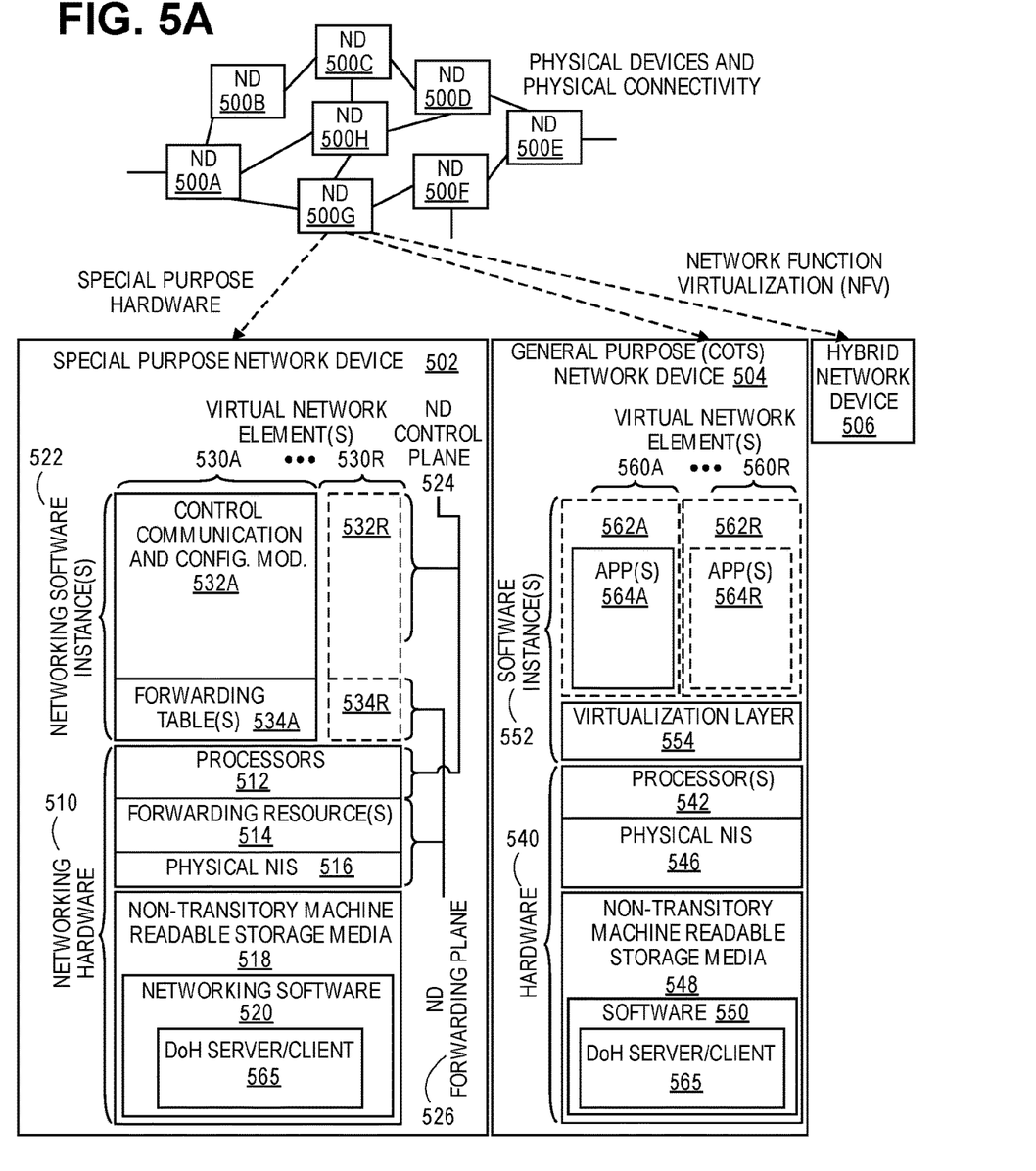
FIG. 5A illustrates connectivity between network devices (NDs) within an exemplary network, as well as three exemplary implementations of the NDs, according to some embodiments of the invention.

FIG. 5A illustrates connectivity between network devices (NDs) within an exemplary network, as well as three exemplary implementations of the NDs, according to some embodiments of the invention. FIG. 5A shows NDs 500A-H, and their connectivity by way of lines between 500A-500B, 500B-500C, 500C-500D, 500D-500E, 500E-500F, 500F-500G, and 500A-500G, as well as between 500H and each of 500A, 500C, 500D, and 500G. These NDs are physical devices, and the connectivity between these NDs can be wireless or wired (often referred to as a link). An additional line extending from NDs 500A, 500E, and 500F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application—specific integrated—circuits (ASICs) and a special-purpose operating system (OS); and 2) a general purpose network device 504 that uses common off-the-shelf (COTS) processors and a standard OS.

The special-purpose network device 502 includes networking hardware 510 comprising a set of one or more processor(s) 512, forwarding resource(s) 514 (which typically include one or more ASICs and/or network processors), and physical network interfaces (NIs) 516 (through which network connections are made, such as those shown by the connectivity between NDs 500A-H), as well as non-transitory machine readable storage media 518 having stored therein networking software 520. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

The networking software 520 can include the DoH Server or Client 565, which implement the processes as described herein above (e.g., in relation to FIGS. 3 and 4, respectively). In other embodiments, the DoH Server or Client 565 can be implemented in a user equipment having similar architecture including non-transitory machine readable storage media, processors, and similar resources.

The special-purpose network device 502 is often physically and/or logically considered to include: 1) a ND control plane 524 (sometimes referred to as a control plane) comprising the processor(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the processor(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

Figure 5B:
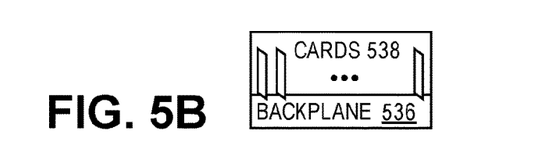
FIG. 5B illustrates an exemplary way to implement a special-purpose network device according to some embodiments of the invention.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and physical NIs 546, as well as non-transitory machine readable storage media 548 having stored therein software 550. During operation, the processor(s) 542 execute the software 550 to instantiate one or more sets of one or more applications 564A-R. While one embodiment does not implement virtualization, alternative embodiments may use different forms of virtualization. For example, in one such alternative embodiment the virtualization layer 554 represents the kernel of an operating system (or a shim executing on a base operating system) that allows for the creation of multiple instances 562A-R called software containers that may each be used to execute one (or more) of the sets of applications 564A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 554 represents a hypervisor (sometimes referred to as a virtual machine monitor (VMM)) or a hypervisor executing on top of a host operating system, and each of the sets of applications 564A-R is run on top of a guest operating system within an instance 562A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 540, directly on a hypervisor (in which case the unikernel is sometimes described as running within a LibOS virtual machine), or in a software container, embodiments can be implemented fully with unikernels running directly on a hypervisor represented by virtualization layer 554, unikernels running within software containers represented by instances 562A-R, or as a combination of unikernels and the above-described techniques (e.g., unikernels and virtual machines both run directly on a hypervisor, unikernels and sets of applications that are run in different software containers).

The networking software 550 can include the DoH Server or Client 565, which implement the processes as described herein above (e.g., in relation to FIGS. 3 and 4, respectively). In other embodiments, the DoH Server or Client 565 can be implemented as virtual network functions in any location in communication with each other.

The instantiation of the one or more sets of one or more applications 564A-R, as well as virtualization if implemented, are collectively referred to as software instance(s) 552. Each set of applications 564A-R, corresponding virtualization construct (e.g., instance 562A-R) if implemented, and that part of the hardware 540 that executes them (be it hardware dedicated to that execution and/or time slices of hardware temporally shared), forms a separate virtual network element(s) 560A-R.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 562A-R to VNEs also apply to embodiments where such a finer level of granularity and/or unikernels are used.

In certain embodiments, the virtualization layer 554 includes a virtual switch that provides similar forwarding services as a physical Ethernet switch. Specifically, this virtual switch forwards traffic between instances 562A-R and the physical NI(s) 546, as well as optionally between the instances 562A-R; in addition, this virtual switch may enforce network isolation between the VNEs 560A-R that by policy are not permitted to communicate with each other (e.g., by honoring virtual local area networks (VLANs)).

The third exemplary ND implementation in FIG. 5A is a hybrid network device 506, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 5C:
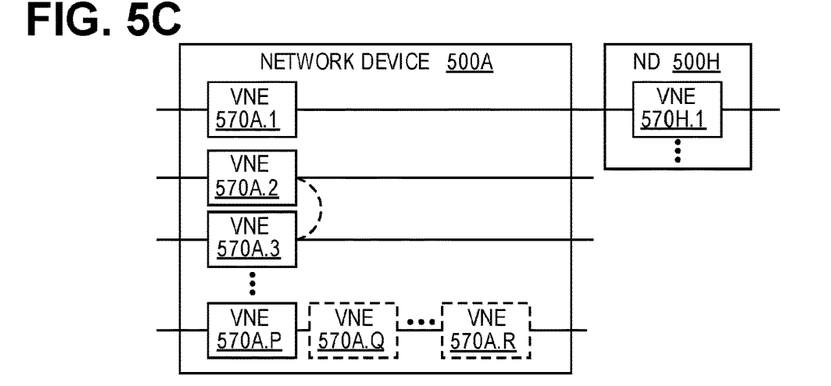
FIG. 5C illustrates various exemplary ways in which virtual network elements (VNEs) may be coupled according to some embodiments of the invention.

FIG. 5C illustrates various exemplary ways in which VNEs may be coupled according to some embodiments of the invention. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software instances 562A-R may operate as servers; the same would be true for the hybrid network device 506; in the case of the special-purpose network device 502, one or more such servers could also be run on a virtualization layer executed by the processor(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 5D:
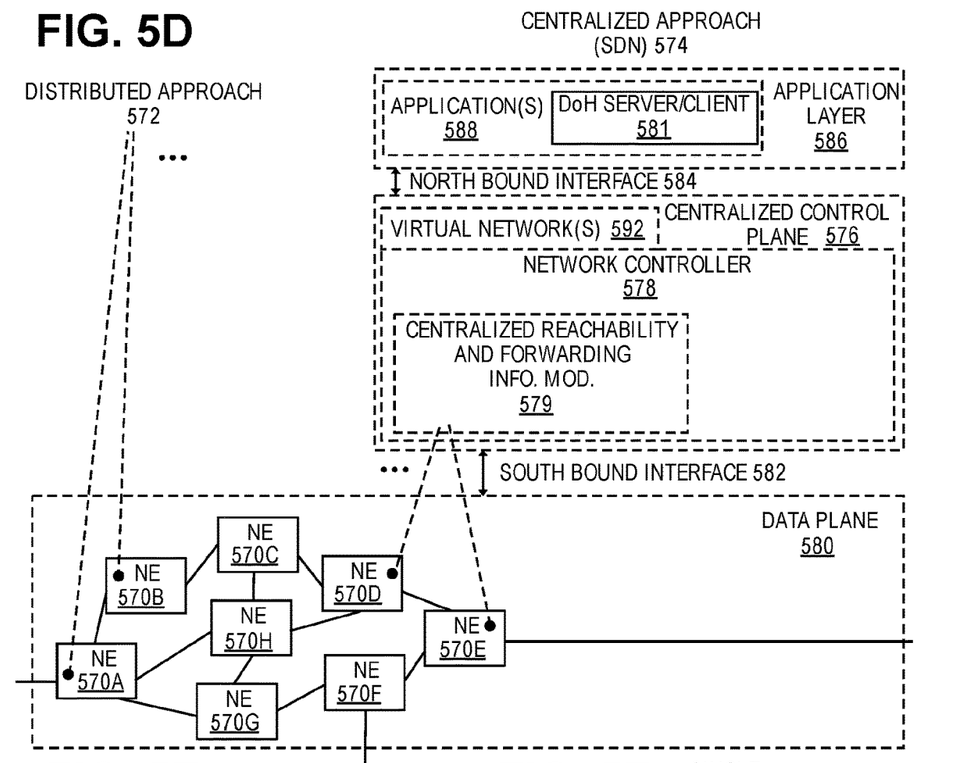
FIG. 5D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments of the invention. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 570A-H (e.g., the processor(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the processor(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

The applications 588 can include the DoH Server or Client 581, which implement the processes as described herein above (e.g., in relation to FIGS. 3 and 4, respectively). In other embodiments, the DoH Server or Client 565 can be implemented in other components of the SDN including in the network controller 578, in the data plane 580, in switches 570A-H and in similar locations.

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

Figure 5E:
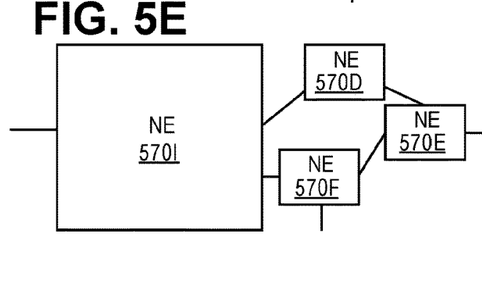
FIG. 5E illustrates the simple case of where each of the NDs implements a single NE, but a centralized control plane has abstracted multiple of the NEs in different NDs into (to represent) a single NE in one of the virtual network(s), according to some embodiments of the invention.
Figure 5F:
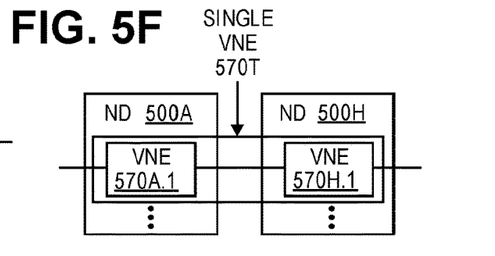
FIG. 5F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 5701 in one of the virtual network(s) 592 of FIG. 5D, according to some embodiments of the invention. FIG. 5E shows that in this virtual network, the NE 5701 is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
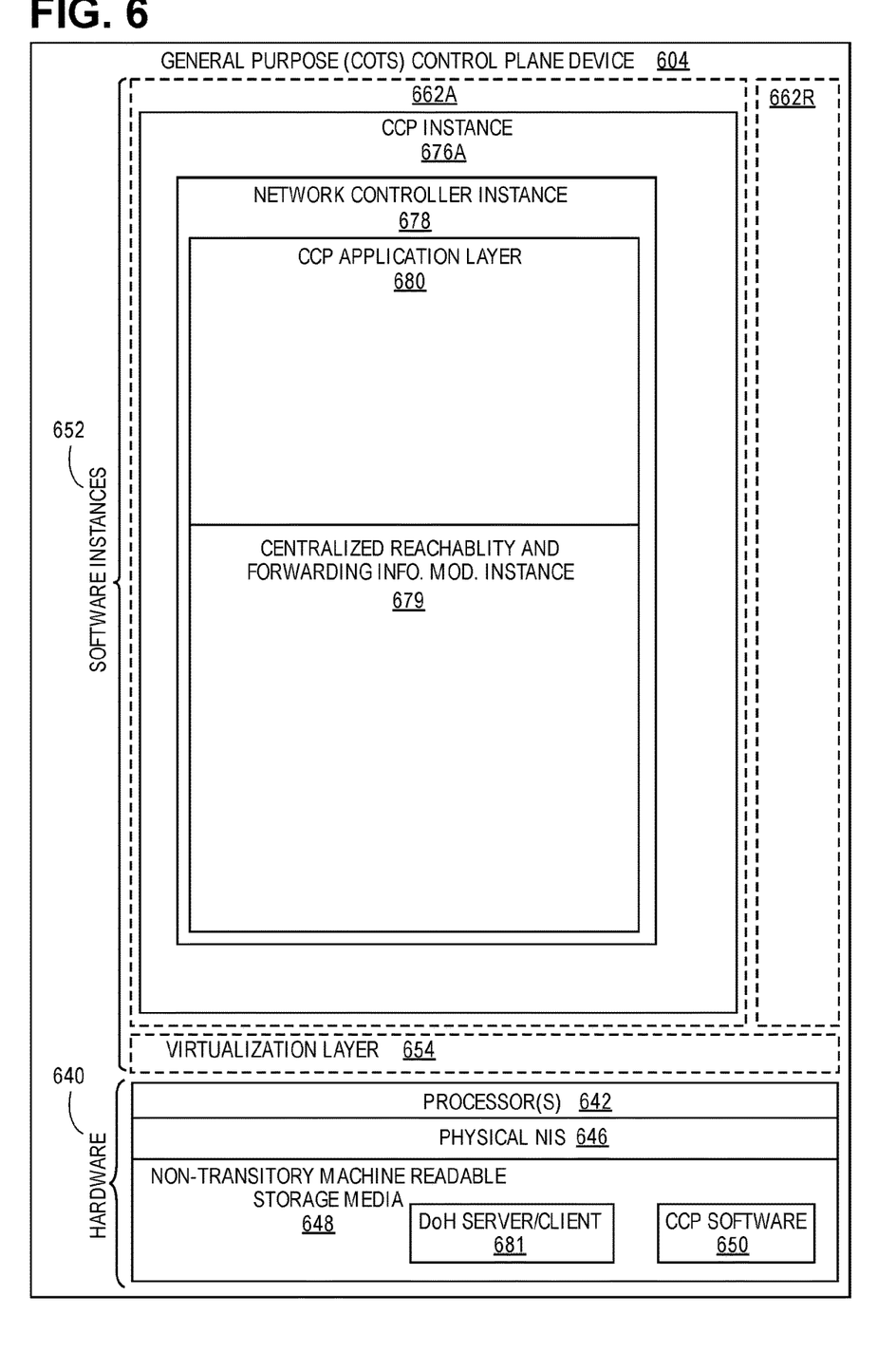
FIG. 6 illustrates a general purpose control plane device with centralized control plane (CCP) software 650), according to some embodiments of the invention.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and physical NIs 646, as well as non-transitory machine readable storage media 648 having stored therein centralized control plane (CCP) software 650.

The non-transitory machine readable medium 648 can also store the DoH Server or Client 565, which implement the processes as described herein above (e.g., in relation to FIGS. 3 and 4, respectively). In other embodiments, the DoH Server or Client 565 can be implemented in network controller instances 678, Applications layers 680 and in similar locations in the control plane device 604.

In embodiments that use compute virtualization, the processor(s) 642 typically execute software to instantiate a virtualization layer 654 (e.g., in one embodiment the virtualization layer 654 represents the kernel of an operating system (or a shim executing on a base operating system) that allows for the creation of multiple instances 662A-R called software containers (representing separate user spaces and also called virtualization engines, virtual private servers, or jails) that may each be used to execute a set of one or more applications; in another embodiment the virtualization layer 654 represents a hypervisor (sometimes referred to as a virtual machine monitor (VMM)) or a hypervisor executing on top of a host operating system, and an application is run on top of a guest operating system within an instance 662A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 640, directly on a hypervisor represented by virtualization layer 654 (in which case the unikernel is sometimes described as running within a LibOS virtual machine), or in a software container represented by one of instances 662A-R). Again, in embodiments where compute virtualization is used, during operation an instance of the CCP software 650 (illustrated as CCP instance 676A) is executed (e.g., within the instance 662A) on the virtualization layer 654. In embodiments where compute virtualization is not used, the CCP instance 676A is executed, as a unikernel or on top of a host operating system, on the "bare metal" general purpose control plane device 604. The instantiation of the CCP instance 676A, as well as the virtualization layer 654 and instances 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user—interfaces). At a more abstract level, this CCP application layer 680 within the centralized control plane 576 works with virtual network view(s) (logical view(s) of the network) and the middleware layer provides the conversion from the virtual networks to the physical view.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of supporting communication between a service executed by an edge server and a mobile application, the method comprising:
receiving a transmission control protocol (TCP) handshake with an Internet Protocol (IP) anycast address from the mobile application, wherein the IP anycast address is associated with an application instance providing the service and the TCP handshake is to query for a presence of the application instance at the edge server;
replying to the TCP handshake with an IP unicast address for the service to be utilized for a transport layer security (TLS) session when the application instance is at the edge server, wherein the IP unicast address is associated with the application instance at the edge server; and
establishing the TLS session between the service and the mobile application using the IP unicast address.

2. The method of claim 1, wherein the IP unicast address is provided in a modified TCP handshake reply.

3. The method of claim 1, wherein the IP unicast address is provided to the mobile application by multipath TCP.

4. The method of claim 1, further comprising:
receiving a domain name system (DNS) over hypertext transfer protocol secure (HTTPS) (DoH) query from the mobile application.

5. The method of claim 4, further comprising:
replying to the DNS query with DNS information via a DoH reply.

6. An electronic device for supporting communication between a service executed by an edge server and a mobile application, the electronic device comprising:
one or more processors; and
a memory comprising instructions which, when executed by the one or more processors, cause the electronic device to:
receive a transmission control protocol (TCP) handshake with an Internet Protocol (IP) anycast address from the mobile application, wherein the IP anycast address is associated with an application instance providing the service and the TCP handshake is to query for a presence of the application instance at the edge server;

reply to the TCP handshake with an IP unicast address for the service to be utilized for a transport layer security (TLS) session when the application instance is at the edge server, wherein the IP unicast address is associated with the application instance at the edge server; and establish the TLS session between the service and the mobile application using the IP unicast address.

7. The electronic device of claim 6, wherein the IP unicast address is provided in a modified TCP handshake reply.

8. The electronic device of claim 6, wherein the IP unicast address is provided to the mobile application by multipath TCP.

9. The electronic device of claim 6, further to:
receive a domain name system (DNS) over hypertext transfer protocol secure (HTTPS) (DoH) query from the mobile application.

10. The electronic device of claim 9, further to:
reply to the DNS query with DNS information via a DoH reply.

11. A method of supporting communication between a mobile application executed by a mobile device and an edge service executed at an edge server, the method comprising:
sending a transmission control protocol (TCP) handshake with an Internet Protocol (IP) anycast address to the edge service, wherein the IP anycast address is associated with an application instance providing the edge service and the TCP handshake is to query for a presence of the application instance at the edge server;

receiving a reply to the TCP handshake with an IP unicast address for the edge service to be utilized for a transport layer security (TLS) session when the application instance is at the edge server, wherein the IP unicast address is associated with the application instance for the edge service; and establishing the TLS session between the edge service and the mobile application using the IP unicast address.

12. The method of claim 11, wherein the IP unicast address is received in a modified TCP handshake reply.

13. The method of claim 11, wherein the IP unicast address is received via multipath TCP.

14. The method of claim 11, further comprising:
sending a domain name system (DNS) over hypertext transfer protocol secure (HTTPS) (DoH) query to the edge service.

15. The method of claim 14, further comprising:
receiving a DoH reply to the DNS query with DNS information.

16. An electronic device for supporting communication between a mobile application executed by a mobile device and an edge service executed at an edge server, the electronic device comprising:
one or more processors; and
a memory comprising instructions which, when executed by the one or more processors, cause the electronic device to:
send a transmission control protocol (TCP) handshake with an Internet Protocol (IP) anycast address to the edge service, wherein the IP anycast address is associated with an application instance providing the service and the TCP handshake is to query for a presence of the application instance at the edge server;

receive a reply to the TCP handshake with an IP unicast address for the edge service to be utilized for a transport layer security (TLS) session when the application instance is at the edge server, wherein the IP unicast address is associated with the application instance for the edge service; and establish the TLS session between the edge service and the mobile application using the IP unicast address.

17. The electronic device of claim 16, wherein the IP unicast address is received in a modified TCP handshake reply.

18. The electronic device of claim 16, wherein the IP unicast address is received via multipath TCP.

19. The electronic device of claim 16, further to:
send a domain name system (DNS) over hypertext transfer protocol secure (HTTPS) (DoH) query to the edge service.

20. The electronic device of claim 19, further to:
receive a DoH reply to the DNS query with DNS information.

* * * * *